United States Patent [19]

Fierkens et al.

[11] Patent Number: 4,712,994

[45] Date of Patent: Dec. 15, 1987

[54] APPARATUS FOR COLD RUNNER TRANSFER MOLDING

[75] Inventors: Richardus H. J. Fierkens, Herwen; Ireneus J. T. M. Pas, Rozendaal, both of Netherlands

[73] Assignee: ASM Fico Tooling, b.v., Herwen, Netherlands

[21] Appl. No.: 919,580

[22] Filed: Oct. 15, 1986

Related U.S. Application Data

[63] Continuation of Ser. No. 628,621, Jul. 6, 1984, abandoned.

[51] Int. Cl.$^4$ ............................................. B29C 45/72
[52] U.S. Cl. ............................... 425/543; 264/272.11; 425/548; 425/564; 425/572
[58] Field of Search ................. 264/272.11, 272.12, 264/272.14, 279; 425/411, 542, 543, 544, 547, 564, 566, 549, 548, DIG. 228, DIG. 229, 572, 588, 562, 563

[56] References Cited

U.S. PATENT DOCUMENTS

| | | | |
|---|---|---|---|
| 2,300,759 | 11/1942 | Amigo | 425/DIG. 229 |
| 2,770,011 | 11/1956 | Kelly | 425/DIG. 229 |
| 3,819,312 | 6/1974 | Arpajian | 425/547 |
| 3,836,307 | 9/1974 | Taylor | 425/DIG. 228 |
| 3,859,024 | 1/1975 | Pasch et al. | 425/DIG. 228 |
| 4,017,242 | 4/1977 | Mercer | 425/548 |
| 4,260,359 | 4/1981 | Dannels et al. | 425/549 |
| 4,340,353 | 7/1982 | Mayer | 425/549 |
| 4,436,496 | 3/1984 | Laghi | 425/543 |

FOREIGN PATENT DOCUMENTS

| | | | |
|---|---|---|---|
| 2852458 | 7/1979 | Fed. Rep. of Germany | 425/544 |
| 7926036 | 5/1981 | France | 425/544 |

Primary Examiner—Jay H. Woo
Assistant Examiner—J. Fortenberry
Attorney, Agent, or Firm—Harry M. Weiss & Associates

[57] ABSTRACT

A method and apparatus for cold runner transfer molding. Insulating and/or cooling means are provided so that the mold runnerblock is kept sufficiently cool to prevent curing of the plastic molding compound therein. By the addition of a plunger near the gate of the mold, a quasi-continuous molding operation may be effected. Local preheating of the molding material at the gate locale may be used to liquefy a feedstock which has travelled through the cold-runners in powdered form.

5 Claims, 2 Drawing Figures

APPARATUS FOR COLD RUNNER TRANSFER MOLDING

BACKGROUND OF THE INVENTION

This application is a continuation, of Ser. No. 628,621, filed July 6, 1984 now abandoned.

1. Field of the Invention

This invention relates generally to the transfer molding of multiple plastic objects, and, more particularly, to the transfer molding of multiple plastic-encapsulated semiconductor devices.

2. Description of the Prior Art

In the transfer molding of a multiplicity of plastic devices in a multi-cavity metallic mold, the prior art practice was to provide a multi-cavity metallic mold comprising separable top and bottom mold portions including a plurality of cavities for the objects to be molded as well as a plurality of runners comprising a distribution system for feeding the molding compound to each of the individual cavities. The runners typically terminate in a common cull or gate area used to source the plastic molding compound to the plurality of cavities. The top and bottom mold halves are held together in a press, and the assembly is heated so that the molding material will cure. The plastic molding material, which is usually in powder form, is pressed or pelletized so that it may be pretreated in a portion of the mold assembly to put it in a liquid or semi-liquid form. A plunger is used to force the heated molding compound under very light pressure into the runner system of the mold for distribution to each of the plurality of object cavities in the multi-cavity mold.

Among the disadvantages of the type of transfer molding system described above are included the fact that molding compound must be pelletized to a size commensurate with the volume of the cavities and runners in the mold to be used. The resulting often large plug of plastic molding compound then may require a substantial time for preheating. Since the runners are in the mold halves along with the object cavities, the heated mold halves also set up or cure the plastic mold compound in the cavities as well as the object cavities where curing of the molded objects are to take place. This may result in a substantial waste of plastic depending on the relative volumes in the runners and the object cavities. Also, because the system does not admit of continuous molding compound feeding, production throughout is limited by the batch nature of the operation. Therefore a need has existed to provide a method and mold members which permit continuous molding compound feeding, preferably from a powder form, for the transfer molding of multiple small objects in a heated multi-cavity mold.

SUMMARY OF THE INVENTION

In accordance wih one embodiment of this invention, it is a object of this invention to provide an improved method and apparatus for the transfer molding of small objects.

It is another object of this invention to provide an improved mold apparatus and method for the insert molding of semiconductor electronic devices and integrated circuits.

It is a further object of this invention to provide an improved method and mold apparatus to permit the substantially continuous feeding of plastic mold compound into a multi-cavity mold.

It is still another object of this invention to provide an improved method and mold apparatus to obviate the necessity of pelletizing the plastic molding compound.

In accordance with a preferred embodiment of the present invention, the runner portions of a multi-cavity mold are thermally insulated from the metallic mold cavities to permit feeding of a stream of molding compound directly to the gate portions of the mold, without curing the plastic in the runner portion of the mold.

According to another embodiment of this invention, cooling is provided for the runner portion of a molding system to prevent curing of the plastic molding compound in the runner system.

According to yet another embodiment of this invention, plastic molding compound is distributed via runners sufficiently cold to prevent curing of the material until it reaches the cull/gate portion of the molding system, where a plunger and local heating are provided to feed liquid molding compound under pressure to the mold cavities.

The foregoing and other objects, features, and advantages of this invention will be apparent from the following, more particular, description of the preferred embodiments of the invention, as illustrated in the accompanying drawing.

THE SPECIFICATION

Figure 1:
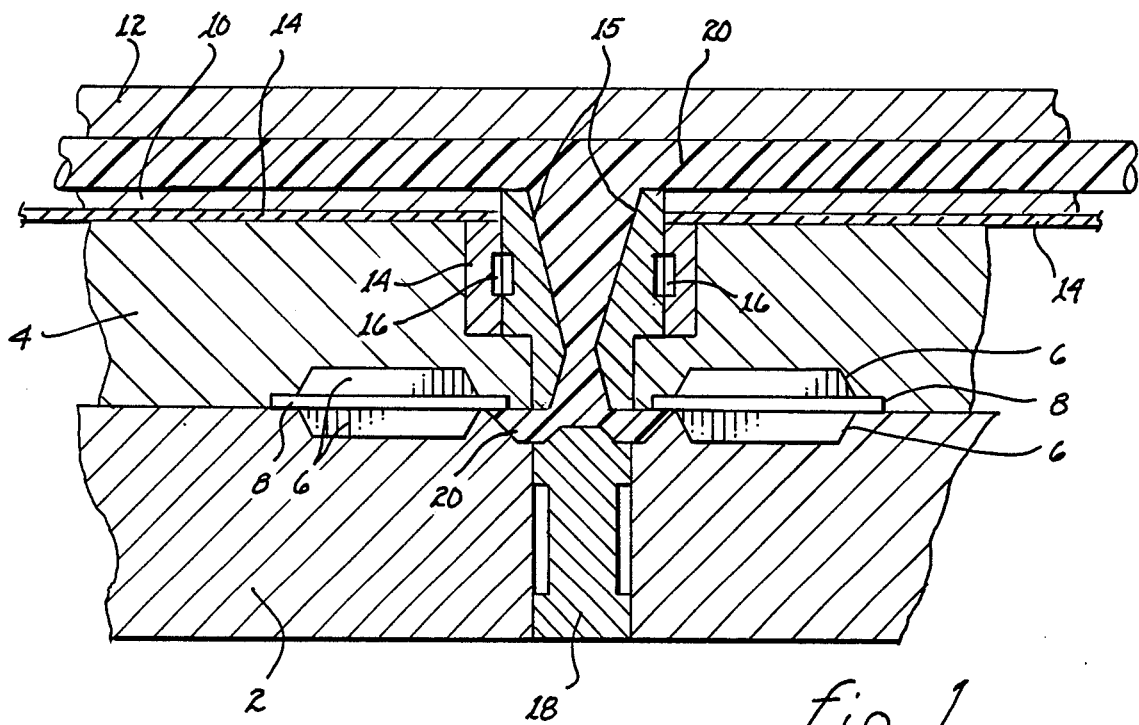
FIG. 1 is a cross-sectional view of the object cavities and cold-runner system of a stationary mold apparatus according to the present invention.

Referring now to FIG. 1, there is illustrated a top half 4 (and the bottom half 2) of a mold suitable for the formation of insert-molded semiconductor electronic packages comprising lead frames 8 partially surrounded by plastic bodies 6. The mold separates along the part-line between upper mold portion 4 and low mold portion 2 to permit extraction of the finished molded plastic objects. Both mold halves are formed from a thermally conductive metallic material, such as stainless steel. Over top mold portion 4 are additional metallic members 10 and 12 forming a portion of a runner means 20 for supplying the plastic molding compound to the lead frame cavities of the mold. The vertical portion of the runner 20 is formed by a block 15 having a tapered orifice. The runner blocks 10 and 12 contain numerous runners 20 to feed a plurality of cavities in the cavity block. Each of the plurality of runners 20 is supplied from a central reservoir of plastic molding material.

Each runner 20 is insulated from the top and bottom mold portions 4 and 2 by thermally insulating material 14 to maintain the temperature of the runner at no more than about 80° C. while the top and bottom mold portions are heated to about 170° C. An insert heating element 18 provides a hot tip for maintaining the temperature in the cull/gate area at about 185° C. to facilitate the heating of the plastic mold compound in the portions of the stream just prior to the entry to the object cavities holding the insert lead frames 8. Passages 16 allow for the passage of coolant to keep the orifice block 15 at a sufficiently low temperature to prevent liquefaction and/or curing of the stream of molding compound in the runner means 20. The partline between the runner block portions 10 and 12 allows them to be separated to clean out the runner if required. Either pressure or vacuum may be applied at the extremities (not shown) of the horizontal portion of the channel 20 so that the plastic molding compound may be supplied to the mold cavities at the onset of the molding cycle and the excess withdrawn after the cavities have been filled with liquefied material.

Figure 2:
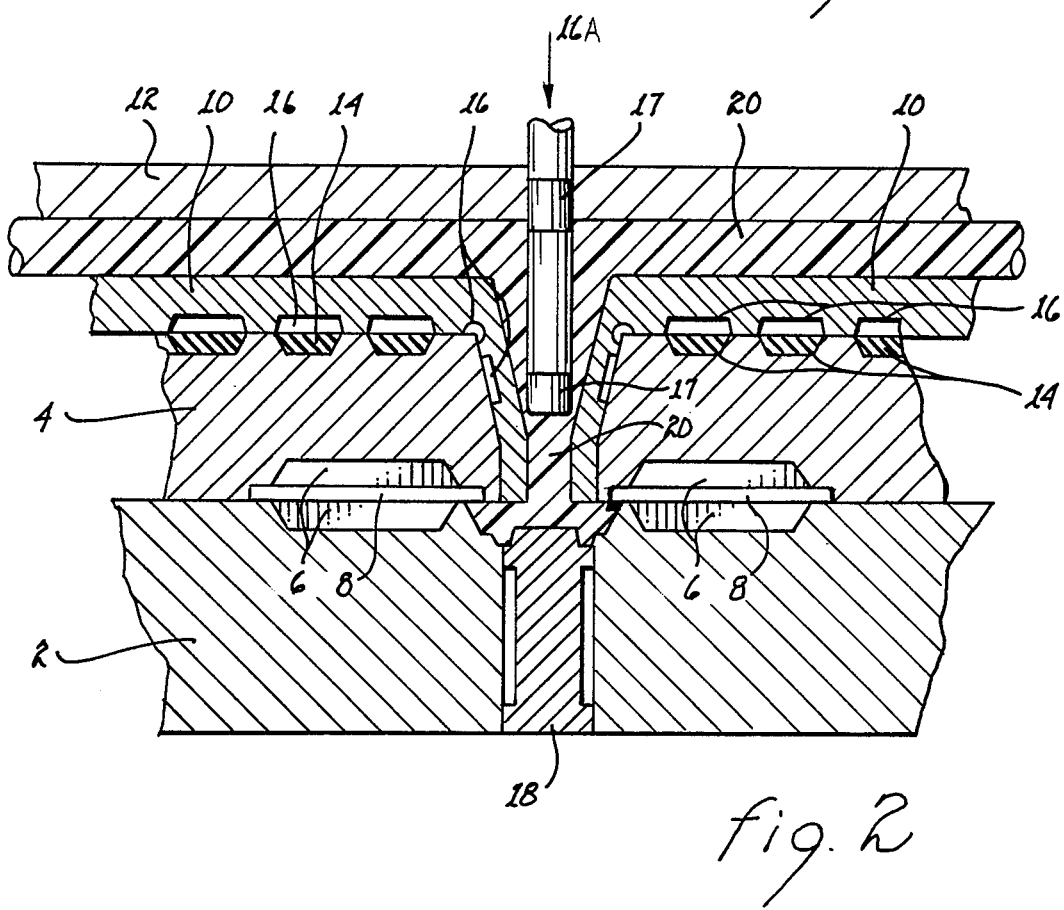
FIG. 2 is a cross-sectional view of a cold-runner mold apparatus including a plunger for use in a system where mold portions are transferred in and out of a mold station in a semi-continuous process.

Referring now to FIG. 2, there is illustrated in cross-section a portion of a mold apparatus similar to that shown by FIG. 1. Top and bottom mold halves 4 and 2 have multiple cavities for the formation of bodies 6 about metallic insets 8. Runner block portions 10 and 12 of the mold apparatus contain a runner 20 for the provision of a stream of plastic molding compound to the mold cavities. The mold apparatus in FIG. 2 differs from that in FIG. 1 in that the runner block portion 10 is maintained at a cooler temperature than top mold 4 by the provision of both insulating material 14 and passages 16 for the flow of coolant. In this way the runner block may be maintained at about 80° C. while the cavity block is maintained at about 170° C. for a much longer period of time than the apparatus of FIG. 1. Thus a more nearly automatic or continuous molding process may be effected by removal of only the bottom portion 2 of the cavity block together with the molded objects after each transfer cycle is completed. The runner block stays cool, and plunger 16A in its downward position prevents passage of plastic material through the orifice. After the lower cavity block portion 2 has been replaced, plunger 16A is raised and then lowered again to force the desired amount of plastic material into the cavity block, where it is heated and liquefied by the hot tip element 18, which is maintained at about 185° C. The plunger 16A comprising plastic ring/tip portions 17 seats in the orifice to maintain high pressure during the curing portion of the cycle.

With the apparatus shown by either of FIGS. 1 or 2, the insulating and/or cooling means keep the temperature of the runner block sufficiently low that curing does not take place in the runner block. It is also possible to keep the temperature of the runner block sufficiently low that there is substantially no melting of the plastic material, in which case the feedback may be unpelletized plastic molding compound.

While the invention has been particularly shown and described with respect to preferred embodiments thereof, it will be understood by those skilled in the art that the foregoing and other changes in form and details may be made therein without departure from the spirit and scope of the invention.

We claim:

1. A mold apparatus for the transfer molding of a plurality of small objects, comprising:
   a cavity block;
   a plurality of cavities in said cavity block;
   gate means for admitting a plastic molding material to each of said cavities;
   a runner block;
   runner means in said runner block for permitting the flow of plastic molding material therethrough;
   plunger means having a plunger tip for forcing said plastic molding material into said plurality of mold cavities and for maintaining said plastic material under high pressure in said cavities;
   insulating means for providing thermal insulation between said runner block and said cavity block;
   cooling means in contact with said runner block for inhibiting curing of said plastic molding material in said runner block; said cooling means comprising a plurality of coolant passageways at a surface of said runner block, said passageways being partially bounded by said insulating means;
   local heating means within said cavity block for heating said plastic molding material prior to said plastic molding material entering said plurality of cavities, said heating means being proximately located in a common passageway within said gate means abutting object cavities wherein curing of said small objects are to take place; and
   said cavity block further having an upper portion and a lower portion, said runner block further having a tapered inner bore, said cooling means being located in said upper portion of said cavity block and surrounding said runner block adjacent to said tapered bore of said runner block, said heating means being a solid plug member and located directly below said tapered bore of said runner block and in said lower portion.

2. The mold apparatus of claim 1 wherein said cooling means maintains the temperature of said runner block at a substantially lower value than said cavity block.

3. The mold apparatus of claim 1 wherein said plunger tip being plastic.

4. The mold apparatus of claim 1 wherein said insulating means and said cooling means substantially prevent curing and liquefication of said plastic molding material in said runner means.

5. The mold apparatus of claim 1 wherein said upper portion and said lower portion of said cavity block being detachable.

* * * * *